United States Patent
Chikagawa (10) Patent No.: US 12,358,341 B2
(45) Date of Patent: Jul. 15, 2025

(54) AIR-CONDITIONING DEVICE FOR VEHICLE

(71) Applicant: MITSUBISHI HEAVY INDUSTRIES THERMAL SYSTEMS, LTD., Tokyo (JP)

(72) Inventor: Noriyuki Chikagawa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 569 days.

(21) Appl. No.: 17/763,502

(22) PCT Filed: Oct. 11, 2019

(86) PCT No.: PCT/JP2019/040221
§ 371 (c)(1),
(2) Date: Mar. 24, 2022

(87) PCT Pub. No.: WO2021/070356
PCT Pub. Date: Apr. 15, 2021

(65) Prior Publication Data
US 2022/0332167 A1    Oct. 20, 2022

(51) Int. Cl.
*B60H 1/00* (2006.01)
(52) U.S. Cl.
CPC ..... *B60H 1/00457* (2013.01); *B60H 1/00021* (2013.01)
(58) Field of Classification Search
CPC ............ B60H 1/00457; B60H 1/00021; B60H 1/00514; B60H 2001/006; F05D 2250/52; F04D 17/04; F04D 29/441
(Continued)

(56) References Cited

U.S. PATENT DOCUMENTS

2002/0131861 A1* 9/2002 Sakai ................... F04D 29/422
                                                                            415/206
2004/0093885 A1    5/2004 Ito et al.
(Continued)

FOREIGN PATENT DOCUMENTS

EP          2154013 A1 *  2/2010   ......... B60H 1/00471
JP       2004-161061 A    6/2004

OTHER PUBLICATIONS

International Search Report for International Application No. PCT/JP2019/040221, dated Dec. 3, 2019, with an English translation.
(Continued)

*Primary Examiner* — Steven B McAllister
*Assistant Examiner* — Charles R Brawner
(74) *Attorney, Agent, or Firm* — Birch, Stewart, Kolasch & Birch, LLP (57) ABSTRACT

This air-conditioning device (10) for a vehicle comprises a flow path width adjustment portion (14) that is provided at an inlet portion (11BA) of a ventilation flow path (11B) so as to be connected to the inner surface (31a) of a first side wall (31), the flow path width adjustment portion (14) having an upper end connected to a fan mounting portion (35), extending downward, and being located between a third wall (33) and a nose portion (37) in the (Y) direction. The nose portion (37) has an inclined portion (37A) that is inclined with respect to the third wall (33) such that the width of the inlet portion (11BA) increases in the (Z) direction from the inlet to the outlet of the inlet portion (11BA) of the ventilation flow path (11B). In the (Z) direction, the flow path width adjustment portion (14) is formed so as to narrow the width of the inlet portion (11BA) of the ventilation flow path (11B) in the (Y) direction.

20 Claims, 6 Drawing Sheets

(58) Field of Classification Search
USPC .......................................................... 454/139
See application file for complete search history.

(56) References Cited

U.S. PATENT DOCUMENTS

2008/0207111 A1* 8/2008 Stroehla ............. B60H 1/00564
454/262
2017/0282683 A1* 10/2017 Schmitt .............. B60H 1/00521

OTHER PUBLICATIONS

Written Opinion of the International Searching Authority for International Application No. PCT/JP2019/040221, dated Dec. 3, 2019, with an English translation.

* cited by examiner

FIG. 6

AIR-CONDITIONING DEVICE FOR VEHICLE

TECHNICAL FIELD

The present invention relates to a vehicle air conditioning device.

BACKGROUND ART

A vehicle air conditioning device applied to a vehicle such as an automobile has a housing, a blowing fan, an evaporator, and a heater core. The vehicle air conditioning device performs blowing at a desired temperature by appropriately mixing cold air generated through the evaporator and warm air generated by the heater core using some of the cold air in the housing (for example, see PTL 1).

As the housing, there is a housing having a fan accommodation space that accommodates the blowing fan, an evaporator accommodation space that accommodates the evaporator, a blowing flow path that is connected to the fan accommodation space and through which air is blown to the evaporator, and a side wall and a nose portion that define an inlet portion of the blowing flow path in a front-rear direction of the housing.

The inlet portion of the blowing flow path is formed to become wider in the front-rear direction of the housing from an inlet side toward an outlet side of the blowing flow path. The blowing flow path includes an increased diameter flow path portion that is disposed downstream of the inlet portion, has a larger diameter than the diameter of the inlet portion, and faces the heater core.

CITATION LIST

Patent Literature

[PTL 1] Japanese Unexamined Patent Application Publication No. 2004-161061

SUMMARY OF INVENTION

Technical Problem

In the vehicle air conditioning device described above, it is desired to make the dimensions of the vehicle air conditioning device as small as possible in order to sufficiently secure a space for providing a device such as an engine or an interior space.

In particular, it is desired to make the dimensions of an outer shape of the vehicle air conditioning device in a front-rear direction of the vehicle (a front-rear direction of the vehicle air conditioning device) small.

When the outer shape of the vehicle air conditioning device is made small as described above, due to a pressure loss occurring when passing through the evaporator or the heater core, backflow of air occurs on a nose portion side of the inlet portion of the blowing flow path, and there is a possibility that noise increases.

Thus, an object of the present invention is to provide a vehicle air conditioning device that can reduce noise caused by backflow of air that occurs in the inlet portion of the blowing flow path while suppressing an increase in size.

Solution to Problem

According to an aspect of the present invention, in order to solve the problem, there is provided a vehicle air conditioning device including a blowing fan that blows air; an evaporator that generates cold air by cooling the air blown from the blowing fan; a heater core that generates warm air by warming the cold air; a housing that has a fan accommodation space which accommodates the blowing fan, a blowing flow path which communicates with the fan accommodation space and guides the air blown from the blowing fan downward, an evaporator accommodation space which is disposed downstream of the blowing flow path, communicates with the blowing flow path, and accommodates the evaporator, a heater core accommodation space which is disposed downstream of the evaporator accommodation space and accommodates the heater core, a first side wall which is disposed on one side in a width direction, a second side wall which is disposed on the other side in the width direction, a third wall which is disposed in a front-rear direction orthogonal to the width direction and connects the first and second side walls to each other, a fan mounting portion which is provided on a surface of an inner surface of the first side wall, which is exposed to the fan accommodation space, and protrudes in a direction from the inner surface of the first side wall toward the second side wall, and on which the blowing fan is mounted, and a nose portion which is disposed on an outlet side of the fan accommodation space and defines an inlet portion of the blowing flow path with the third wall in the front-rear direction; and a flow path width adjusting unit that is provided at the inlet portion of the blowing flow path by being connected to the inner surface of the first side wall, has an upper end connected to the fan mounting portion, extends downward, and is disposed between the third wall and the nose portion in the front-rear direction. The nose portion has an inclined portion that is inclined with respect to the third wall such that a width of the inlet portion of the blowing flow path increases in a direction from an inlet toward an outlet of the blowing flow path. The flow path width adjusting unit is formed such that a width of the inlet portion of the blowing flow path in the front-rear direction decreases.

With the present invention, by providing the flow path width adjusting unit configured as described above, it is possible to move a position where the inlet portion of the blowing flow path is formed from a vicinity of the nose portion, in which backflow of air is likely to occur, to a third wall side.

Accordingly, since it is possible to suppress occurrence of backflow of air in the inlet portion of the blowing flow path formed between the third wall and the flow path width adjusting unit, noise caused by the backflow of the air that has occurred in the inlet portion of the blowing flow path can be reduced while suppressing an increase in the size of the vehicle air conditioning device.

In addition, in the vehicle air conditioning device according to the present invention, the flow path width adjusting unit may include a flow path width adjusting surface that is disposed on a third wall side and is formed such that the width of the inlet portion of the blowing flow path in the front-rear direction decreases, and the flow path width adjusting surface is disposed between an imaginary plane that passes through an intermediate position between a position of the nose portion, at which a distance between the nose portion and the third wall in the front-rear direction is shortest, and a position of the third wall and the position of the nose portion.

By disposing the flow path width adjusting surface between the imaginary plane that passes through the intermediate position between the position of the nose portion, at which the distance between the nose portion and the third wall in the front-rear direction is shortest, and the position of the third wall and the position of the nose portion as described above, it is possible to prevent the flow path width adjusting unit corresponding to the flow path width adjusting surface from becoming a large barrier to flow of air. Accordingly, without limiting cooling performance, noise caused by backflow of air that has occurred in the inlet portion of the blowing flow path can be reduced.

In addition, in the vehicle air conditioning device according to the present invention, the flow path width adjusting unit may be disposed such that the width of the inlet portion in the front-rear direction is a constant value in a direction in which the inlet portion extends.

As described above, since it is possible to prevent the flow path width adjusting unit from becoming a barrier to blown air by making the width of the inlet portion of the blowing flow path in the front-rear direction constant in the direction in which the inlet portion extends, an effect of noise reduction in the inlet portion of the blowing flow path can be increased.

In addition, in the vehicle air conditioning device according to the present invention, a width of the flow path width adjusting unit in the width direction may be equal to or smaller than a thickness of the fan mounting portion in the width direction.

As described above, by making the width of the flow path width adjusting unit equal to or smaller than the thickness of the fan mounting portion, it is possible to prevent an end part of the flow path width adjusting unit and the blowing fan from facing each other in a radial direction of the blowing fan. Accordingly, it is possible to prevent the flow path width adjusting unit from becoming a barrier to flow of air sent from the blowing fan. Therefore, noise caused by backflow of air that has occurred in the inlet portion of the blowing flow path can be reduced without disturbing the flow of the air from the blowing fan.

In addition, in the vehicle air conditioning device according to the present invention, the blowing flow path may include an increased diameter flow path portion that is disposed downstream of the inlet portion of the blowing flow path, communicates with the inlet portion, extends in the front-rear direction to face the evaporator, and has a flow path cross-sectional area larger than the inlet portion, and a lower end of the flow path width adjusting unit may be disposed above a lower end of the nose portion.

By disposing the lower end of the flow path width adjusting unit above the lower end of the nose portion as described above, a lower portion of the flow path width adjusting unit can be prevented from becoming a barrier to flow of air when the air flows from the inlet portion of the blowing flow path into the flow path having a flow path cross-sectional area larger than the inlet portion.

In addition, in the vehicle air conditioning device according to the present invention, the flow path width adjusting unit may be a plate member that has a flow path width adjusting surface disposed on a third wall side.

By using the plate member that has the flow path width adjusting surface disposed on the third wall side as the flow path width adjusting unit as described above, the width of the inlet portion of the blowing flow path in the front-rear direction can be decreased.

In addition, in the vehicle air conditioning device according to the present invention, the flow path width adjusting unit may be a block material that has a flow path width adjusting surface disposed on a third wall side.

By using the block material that has the flow path width adjusting surface disposed on the third wall side as the flow path width adjusting unit as described above, the width of the inlet portion of the blowing flow path in the front-rear direction can be decreased.

Advantageous Effects of Invention

With the present invention, noise caused by backflow of air that has occurred in the inlet portion of the blowing flow path can be reduced while suppressing an increase in size.

DESCRIPTION OF EMBODIMENTS

A vehicle air conditioning device 10 of the present embodiment will be described with reference to FIGS. 1 to 5.

Figure 1:
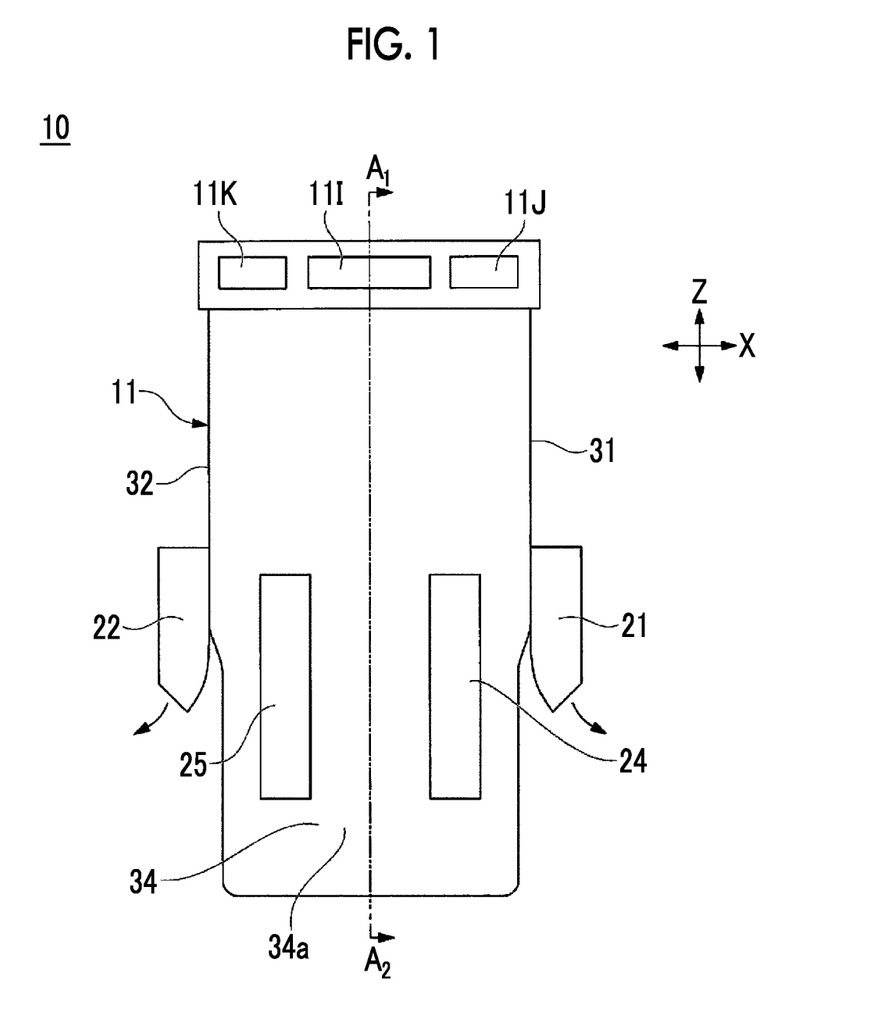
FIG. 1 is a view seen from one side in a front-rear direction of a vehicle air conditioning device according to an embodiment of the present invention.
Figure 2:
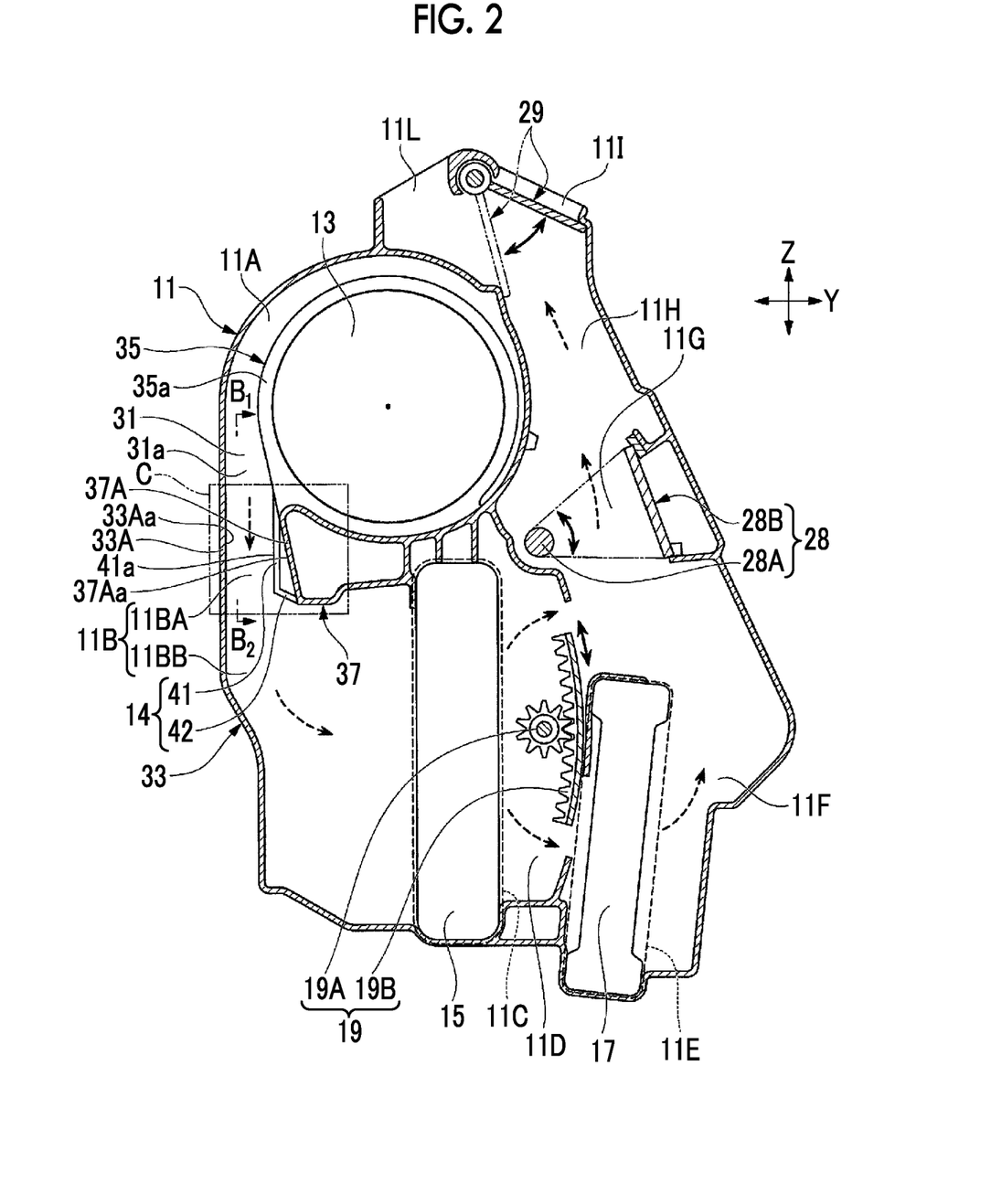
FIG. 2 is a cross-sectional view taken along line $A_1$-$A_2$ of the vehicle air conditioning device shown in FIG. 1.
Figure 3:
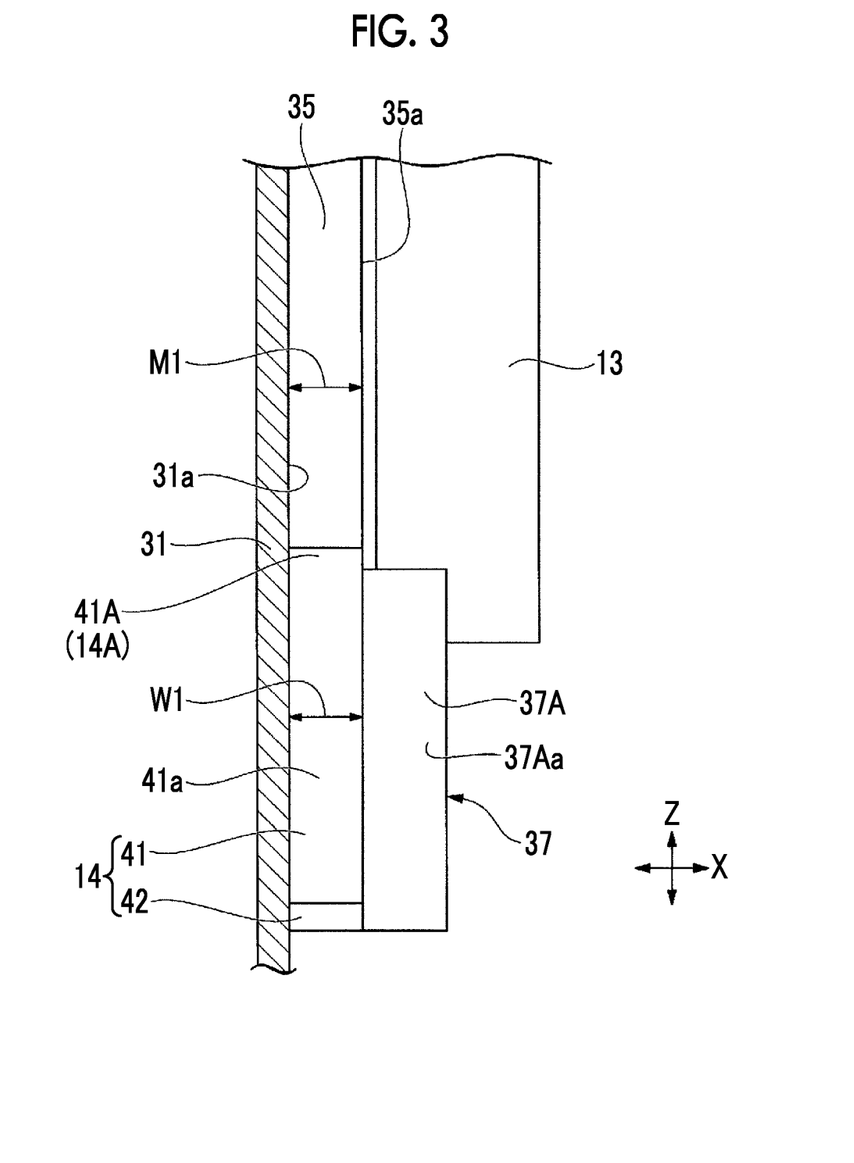
FIG. 3 is a cross-sectional view taken along line $B_1$-$B_2$ of a structure shown in FIG. 2.

An X-direction shown in FIGS. 1 and 3 shows a width direction of a housing 11 (a width direction of the vehicle air conditioning device 10). A Y-direction shown in FIGS. 2, 4, and 5 shows a front-rear direction of the housing 11 (a front-rear direction of the vehicle air conditioning device 10) orthogonal to the X-direction.

A Z-direction shown in FIGS. 1 to 5 shows a height direction of the housing 11 (a height direction of the vehicle air conditioning device 10) orthogonal to the X-direction and the Y-direction.

Dotted arrows shown in FIG. 2 show directions in which air moves. In FIG. 3, M1 indicates a thickness (hereinafter, referred to as a "thickness M1") of a fan mounting portion 35 in the X-direction, and W1 indicates a width (hereinafter, referred to as a "width W1") of a flow path width adjusting unit 14 in the X-direction.

Figure 4:
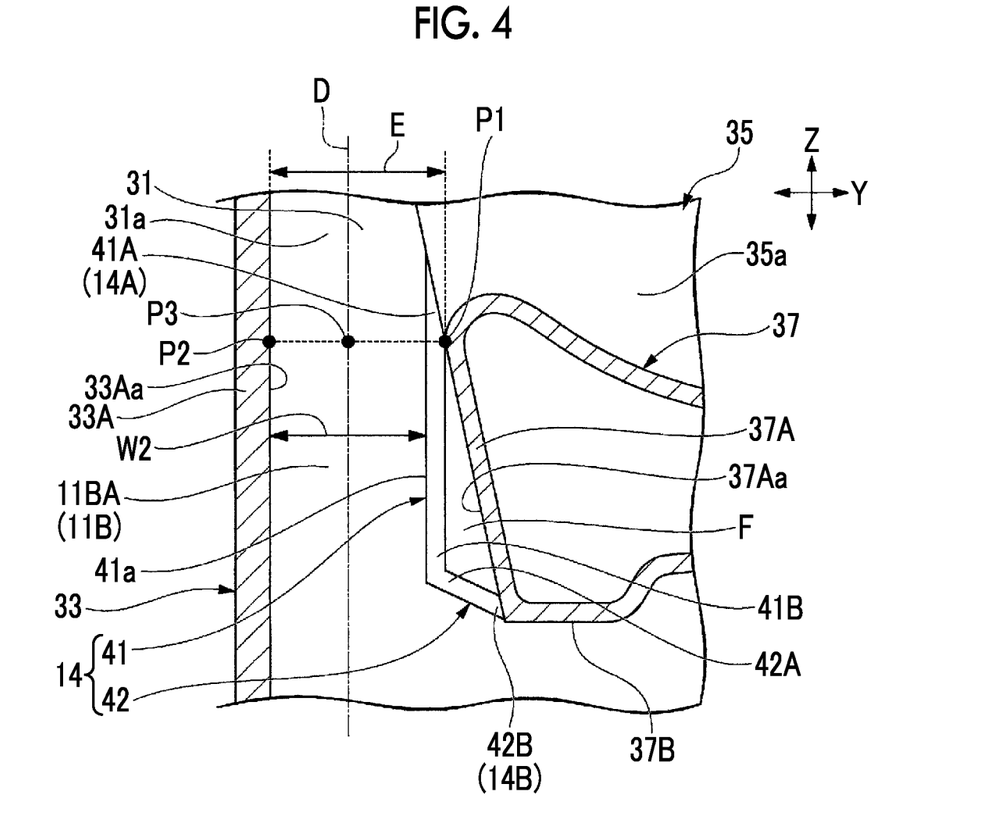
FIG. 4 is an enlarged view of a portion of the structure shown in FIG. 2, which is surrounded by a region C.
Figure 5:
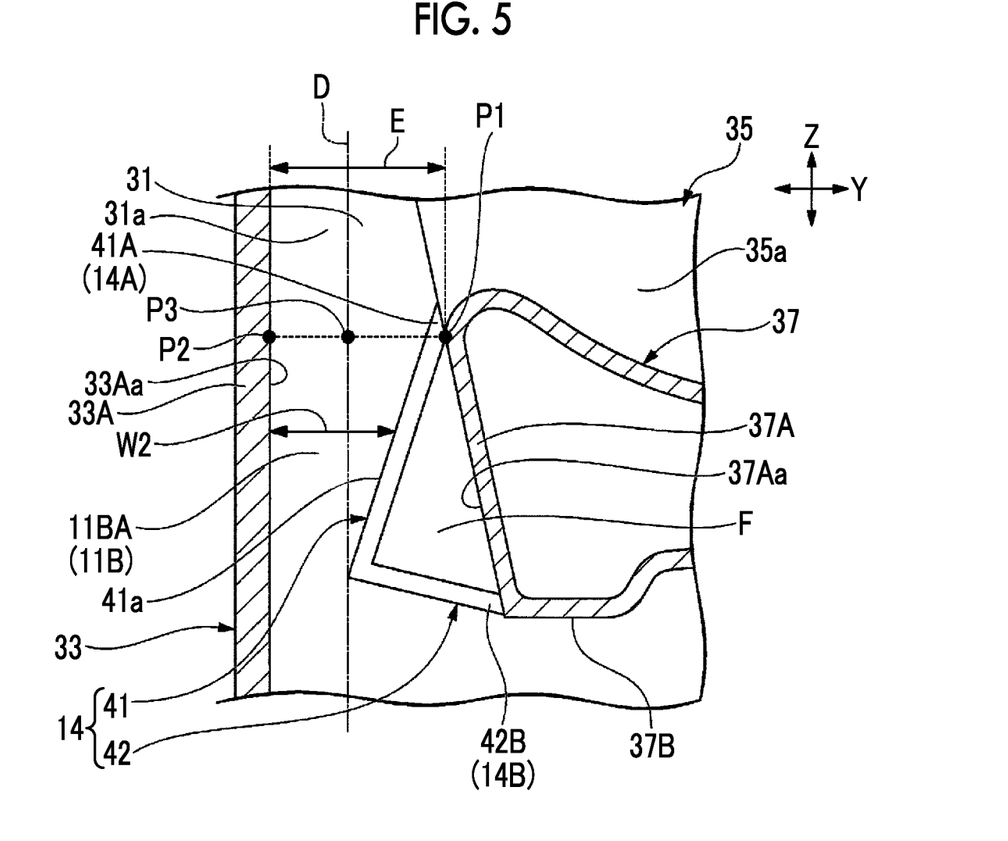
FIG. 5 is a view for describing a region where a flow path width adjusting surface can be disposed.

In FIGS. 4 and 5, P1 indicates a position (hereinafter, referred to as a "position P1") of a nose portion at which a distance E between a nose portion 37 and a third wall 33 in the X-direction is shortest, P2 indicates a position (hereinafter, referred to as a "position P2") of an inner surface 33Aa (a part of the third wall 33) of a side wall portion 33A, at which the distance E between the nose portion 37 and the third wall 33 is shortest in the X-direction, and P3 indicates an intermediate position (hereinafter, referred to as an "intermediate position P3") between the position P1 and the position P2.

In FIGS. 4 and 5, W2 indicates a width (hereinafter, referred to as a "width W2") of a blowing flow path 11B formed between the side wall portion 33A and the flow path width adjusting unit 14 in the Y-direction.

In FIGS. 1 to 5, the same components will be assigned with the same reference signs.

A position of a defroster face damper 29 shown by a dotted line in FIG. 2 means a position at which the defroster face damper 29 opens a center face discharge outlet 11I and side face discharge outlets 11J and 11K.

The vehicle air conditioning device 10 has the housing 11, a blowing fan 13, the flow path width adjusting unit 14, an evaporator 15, a heater core 17, a sliding damper 19, front foot ducts 21 and 22, rear foot ducts 24 and 25, a foot rotary damper 28, and the defroster face damper 29.

The housing 11 is divided into a fan accommodation space 11A, the blowing flow path 11B, an evaporator accommodation space 11C, a cold air flow path 11D, a heater core accommodation space 11E, a warm air flow path 11F, an air mixing space 11G, a defroster and face flow path 11H, the center face discharge outlet 11I, the side face discharge outlets 11J and 11K, and a defroster discharge outlet 11L.

The fan accommodation space 11A is a space that accommodates the blowing fan 13.

The blowing flow path 11B is disposed below the fan accommodation space 11A. The blowing flow path 11B communicates with the fan accommodation space 11A and the evaporator accommodation space 11C. The blowing flow path 11B has an inlet portion 11BA and an increased diameter flow path portion 11BB.

The inlet portion 11BA communicates with the fan accommodation space 11A, and extends below the fan accommodation space 11A. The inlet portion 11BA is disposed between the third wall 33 and the nose portion 37, which configure the housing 11.

The increased diameter flow path portion 11BB is disposed downstream of the inlet portion 11BA, and communicates with the inlet portion 11BA and the evaporator accommodation space 11C. The increased diameter flow path portion 11BB extends in the Y-direction, and faces the evaporator 15. The increased diameter flow path portion 11BB is configured to have a flow path cross-sectional area larger than the inlet portion 11BA.

The blowing flow path 11B configured as described above guides air blown from the blowing fan 13 to the evaporator 15.

The evaporator accommodation space 11C is disposed downstream of the blowing flow path 11B. The evaporator accommodation space 11C communicates with the blowing flow path 11B. Accordingly, air blown by the blowing fan 13 is supplied to the evaporator accommodation space 11C via the blowing flow path 11B. The evaporator accommodation space 11C is a space for accommodating the evaporator 15.

The cold air flow path 11D is disposed downstream of the evaporator accommodation space 11C. The cold air flow path 11D communicates with the evaporator accommodation space 11C. Air (cold air) cooled by the evaporator 15 flows in the cold air flow path 11D.

The heater core accommodation space 11E is disposed downstream (the downstream of the evaporator accommodation space 11C) of the cold air flow path 11D. The heater core accommodation space 11E is a space for accommodating the heater core 17.

The warm air flow path 11F is disposed downstream of the heater core accommodation space 11E. The warm air flow path 11F communicates with the heater core accommodation space 11E. Warm air warmed by the heater core 17 flows in the warm air flow path 11F.

The air mixing space 11G is disposed downstream of the cold air flow path 11D and the warm air flow path 11F. At a position of a sliding damper body 19B (one of components of the sliding damper 19) shown in FIG. 2, the air mixing space 11G communicates with the cold air flow path 11D and the warm air flow path 11F. In this state, cold air and warm air are supplied to the air mixing space 11G, the cold air and the warm air are mixed, and thereby air having a desired temperature is generated.

In a case where the position of the sliding damper body 19B shown in FIG. 2 slides downward and cold air from the evaporator 15 is not supplied to the heater core 17, only cold air is supplied to the air mixing space 11G.

The defroster and face flow path 11H is disposed above the air mixing space 11G. At a position of the foot rotary damper 28 shown in FIG. 2, the defroster and face flow path 11H communicates with the air mixing space 11G.

In this state, air which has passed through the air mixing space 11G is supplied to the defroster and face flow path 11H.

In a case where the foot rotary damper 28 blocks an inlet of the defroster and face flow path 11H, air which has passed through the air mixing space 11G is not supplied to the defroster and face flow path 11H.

The center face discharge outlet 11I and the side face discharge outlets 11J and 11K are provided downstream of the defroster and face flow path 11H, and communicate with the defroster and face flow path 11H. The side face discharge outlets 11J and 11K are disposed such that the defroster and face flow path 11H is interposed therebetween from the X-direction.

The defroster discharge outlet 11L is disposed downstream of the defroster and face flow path 11H, and communicates with the defroster and face flow path 11H. The defroster discharge outlet 11L is disposed on a blowing fan side from positions where the center face discharge outlet 11I and the side face discharge outlets 11J and 11K are formed.

The housing 11 has a first side wall 31, a second side wall 32, the third wall 33, a fourth wall 34, the fan mounting portion 35, and the nose portion 37.

The first side wall 31 is disposed on one side in the X-direction (one side in the width direction). The first side wall 31 has an inner surface 31a.

The second side wall 32 is disposed on the other side in the X-direction (the other side in the width direction). The second side wall 32 faces the first side wall 31 (specifically, the inner surface 31a of the first side wall 31) in the X-direction.

The first and second side walls 31 and 32 configured as described above define the X-direction of the fan accommodation space 11A, the blowing flow path 11B, the evaporator accommodation space 11C, the cold air flow path 11D, the heater core accommodation space 11E, the warm air flow path 11F, the air mixing space 11G, and the defroster and face flow path 11H.

The third wall 33 is disposed on the other side in the Y-direction. The third wall 33 has an end part on the one side in the X-direction, which is connected to the first side wall 31, and an end part on the other side in the X-direction, which is connected to the second side wall 32.

The third wall 33 defines the other sides of the fan accommodation space 11A, the blowing flow path 11B, and the evaporator accommodation space 11C in the Y-direction.

The third wall 33 has the side wall portion 33A which defines the inlet portion 11BA of the blowing flow path 11B. The side wall portion 33A extends in the Z-direction. The side wall portion 33A has the inner surface 33Aa orthogonal to the Y-direction.

The fourth wall 34 is disposed on one side in the Y-direction, and has an outer surface 34a. The fourth wall 34 has an end part on the one side in the X-direction, which is connected to the first side wall 31, and an end part on the other side in the X-direction, which is connected to the second side wall 32.

The fan mounting portion 35 is provided on a surface of the inner surface 31a of the first side wall 31, which is exposed to the fan accommodation space 11A. The fan mounting portion 35 protrudes in a direction from the inner surface 31a of the first side wall 31 toward the second side wall 32.

The fan mounting portion 35 faces the second side wall 32 in the X-direction. The fan mounting portion 35 has a surface 35a facing the blowing fan 13 mounted on the fan mounting portion 35. An outer shape of the fan mounting portion 35 is configured to be larger than an outer diameter of the blowing fan 13.

The nose portion 37 is disposed between the first side wall 31 and the second side wall 32. The nose portion 37 has an inclined portion 37A that faces the side wall portion 33A of the third wall 33 with the inlet portion 11BA of the blowing flow path 11B sandwiched therebetween in the Y-direction.

The inclined portion 37A has an inclined surface 37Aa that inclines with respect to the inner surface 33Aa of the side wall portion 33A such that a width of the inlet portion 11BA of the blowing flow path 11B increases from an inlet toward an outlet of the blowing flow path 11B.

For this reason, in a case where the side wall portion 33A and the inclined portion 37A define the Y-direction of the inlet portion 11BA, the width of the inlet portion 11BA in the Y-direction increases from an inlet toward an outlet of the inlet portion 11BA.

In a state where a fan body is rotatable, the blowing fan 13 is fixed to the fan mounting portion 35. A ring-shaped flow path is formed in a circumferential direction of the blowing fan 13. The ring-shaped flow path is configured such that a width of a radial direction of the blowing fan 13 gradually increases from an inlet toward an outlet. The blowing fan 13 blows air to the blowing flow path 11B.

The flow path width adjusting unit 14 has a flow path width adjusting unit body 41 and a lid body 42.

The flow path width adjusting unit body 41 has a plate shape disposed at a portion of the inlet portion 11BA of the blowing flow path 11B, which is positioned between the side wall portion 33A and the inclined portion 37A. The flow path width adjusting unit body 41 is disposed such that the width of the inlet portion 11BA of the blowing flow path 11B in the Y-direction decreases.

An end part of the flow path width adjusting unit body 41, which is on the one side in the X-direction, is connected to the inner surface 31a of the first side wall 31 positioned between the side wall portion 33A and the inclined portion 37A.

Since there is no gap between the inner surface 31a of the first side wall 31 and the flow path width adjusting unit body 41 by connecting the end part of the flow path width adjusting unit body 41, which is on the one side in the X-direction, and the inner surface 31a of the first side wall 31 to each other as described above, it is possible to suppress flowing of air from a portion between the first side wall 31 and the flow path width adjusting unit body 41 to an inclined portion 37A side of the nose portion 37.

Accordingly, occurrence of backflow of air caused by the flowing of the air from the portion between the first side wall 31 and the flow path width adjusting unit body 41 to the inclined portion 37A side of the nose portion 37 can be suppressed.

An upper end 41A of the flow path width adjusting unit body 41 (an upper end 14A of the flow path width adjusting unit 14) is connected to the fan mounting portion 35.

Since a gap is not formed between the upper end 41A of the flow path width adjusting unit body 41 and the fan mounting portion 35 by connecting the upper end 41A of the flow path width adjusting unit body 41 to the fan mounting portion 35 as described above, it is possible to suppress flowing of air from a portion between the upper end 41A of the flow path width adjusting unit body 41 and the fan mounting portion 35 to the inclined portion 37A side of the nose portion 37.

Accordingly, occurrence of backflow of air caused by the flowing of the air from the portion between the upper end 41A of the flow path width adjusting unit body 41 and the fan mounting portion 35 to the inclined portion 37A side of the nose portion 37 can be suppressed.

The flow path width adjusting unit body 41 extends from a connection position between the upper end 41A and the fan mounting portion 35 to one side in the Z-direction toward a bottom portion of the housing 11. The flow path width adjusting unit body 41 has a flow path width adjusting surface 41a that faces the inner surface 33Aa of the side wall portion 33A and that is parallel to the inner surface 33Aa. The flow path width adjusting surface 41a defines the Y-direction of the inlet portion 11BA of the blowing flow path 11B, together with the inner surface 33Aa.

By providing the flow path width adjusting unit body 41 described above, it is possible to move a position where the inlet portion 11BA of the blowing flow path 11B is formed from a vicinity of the nose portion 37, in which backflow of air is likely to occur, to a third wall 33 side.

Accordingly, since it is possible to suppress occurrence of the backflow of the air in the inlet portion 11BA of the blowing flow path 11B formed between the third wall 33 and the flow path width adjusting unit body 41, noise caused by the backflow of the air that has occurred in the inlet portion 11BA of the blowing flow path 11B can be reduced while suppressing an increase in the size of the vehicle air conditioning device 10.

The flow path width adjusting surface 41a may be disposed between an imaginary plane D, which passes through the intermediate position P3 between the position P1 of the nose portion 37, at which a distance between the nose portion 37 and the side wall portion 33A of the third wall in the Y-direction is shortest, and the position P2 of the side wall portion 33A, and the position P1 of the nose portion 37.

As described above, by disposing the flow path width adjusting surface 41a between the imaginary plane D, which passes through the intermediate position P3, and the position P1 of the nose portion 37, it is possible to prevent the flow path width adjusting unit body 41 corresponding to the flow path width adjusting surface 41a from becoming a large barrier to flow of air. Accordingly, without limiting cooling performance, noise caused by backflow of air that has occurred in the inlet portion 11BA of the blowing flow path 11B can be reduced.

In addition, the flow path width adjusting unit body may be disposed, for example, in the Z-direction (a direction in which the inlet portion 11BA extends) such that the width W2 of the inlet portion 11BA in the Y-direction is a constant value (see FIG. 4).

By making the width W2 of the inlet portion 11BA the constant value as described above, an effect of noise reduction in the inlet portion 11BA can be increased without the flow path width adjusting unit body 41 becoming a barrier in the Z-direction.

The lid body 42 has a plate shape, one end part 42A is connected to a lower end 41B of the flow path width adjusting unit body 41, and the other end part 42B (a lower end 14B of the flow path width adjusting unit 14) is connected to a lower portion of the inclined portion 37A. An end part of the lid body 42 on one side in the X-direction is connected to the inner surface 31a of the first side wall 31.

The lid body 42 blocks an inlet of a space F formed between the flow path width adjusting unit body 41 and the inclined portion 37A. By providing the lid body 42 configured as described above, occurrence of backflow of air in the space F can be suppressed.

It is preferable to set the width W1 of the flow path width adjusting unit 14 configured as described above, for example, within a range of the thickness M1 of the fan mounting portion 35 or smaller.

As described above, by making the width W1 of the flow path width adjusting unit 14 equal to or smaller than the thickness M1 of the fan mounting portion 35, it is possible to prevent an end part of the flow path width adjusting unit 14 on the other side in the X-direction and the blowing fan from facing each other in the radial direction of the blowing fan 13.

Accordingly, it is possible to prevent the flow path width adjusting unit 14 from becoming a barrier to flow of air sent from the blowing fan 13. Therefore, noise caused by backflow of air that has occurred in the inlet portion 11BA of the blowing flow path 11B can be reduced without disturbing the flow of the air from the blowing fan 13.

In addition, it is preferable to dispose the lower end 14B of the flow path width adjusting unit 14 configured as described above, for example, above a lower end 37B of the nose portion 37.

By disposing the lower end 14B of the flow path width adjusting unit 14 above the lower end 37B of the nose portion as described above, a lower portion of the flow path width adjusting unit 14 can be prevented from becoming a barrier to flow of air when air flows from the inlet portion 11BA of the blowing flow path 11B into the increased diameter flow path portion 11BB having a flow path cross-sectional area larger than a flow path cross-sectional area of the inlet portion 11BA.

The evaporator 15 is disposed in the evaporator accommodation space 11C. The evaporator 15 generates cold air by cooling air supplied from the blowing fan 13. The generated cold air flows in the cold air flow path 11D.

The heater core 17 is disposed in the heater core accommodation space 11E. When cold air is supplied from the evaporator 15, the heater core 17 generates warm air by warming the cold air. The generated warm air flows in the warm air flow path 11F.

The sliding damper 19 is accommodated in the housing 11, and is disposed between the evaporator 15 and the heater core 17. The sliding damper 19 has a rotary shaft 19A and the sliding damper body 19B.

The rotary shaft 19A is configured to be movable rotationally about an axis. A plurality of irregularities are formed in a circumferential direction of the rotary shaft 19A.

The sliding damper body 19B is disposed on a heater core 17 side from a position where the rotary shaft 19A is disposed. The sliding damper body 19B has irregularities that engage with the irregularities of the rotary shaft 19A.

When the rotary shaft 19A rotates clockwise in the state shown in FIG. 2, the sliding damper body 19B slides (moves) downward. On the other hand, when the rotary shaft 19A rotates counterclockwise in the state shown in FIG. 2, the sliding damper body 19B slides (moves) upward.

The front foot duct 21 is provided on an outer surface of the first side wall 31. The front foot duct 21 defines a front foot flow path. An inlet of the front foot flow path communicates with the air mixing space 11G.

The front foot duct 22 is provided on an outer surface of the second side wall 32. The front foot ducts 21 and 22 are disposed to sandwich the housing 11 from the X-direction.

The front foot duct 22 defines the front foot flow path. The inlet of the front foot flow path communicates with the air mixing space 11G.

The rear foot ducts 24 and 25 are provided at a lower portion of the outer surface 34a of the fourth wall 34. The rear foot ducts 24 and 25 are disposed in the X-direction.

The rear foot duct 24 defines a rear foot flow path that communicates with the air mixing space 11G. The rear foot duct 25 defines the rear foot flow path that communicates with the air mixing space 11G.

The foot rotary damper 28 is disposed in the air mixing space 11G. The foot rotary damper 28 has a rotary shaft 28A and a damper body 28B that moves rotationally together with the rotary shaft 28A.

As the foot rotary damper 28 rotates the rotary shaft 28A to change the position of the damper body 28B, the foot rotary damper 28 regulates an opening degree of the inlet of the defroster and face flow path 11H and opening degrees of the inlets of the front foot flow path and the rear foot flow path.

The defroster face damper 29 is positioned between the center face discharge outlet 11I and the side face discharge outlets 11J and 11K, and the defroster discharge outlet 11L, and is provided in a rotationally movable state in the housing 11.

The defroster face damper 29 regulates opening degrees of the center face discharge outlet 11I, the side face discharge outlets 11J and 11K, and the defroster discharge outlet 11L.

By providing the flow path width adjusting unit 14 described above in the vehicle air conditioning device 10 of the present embodiment, it is possible to move the position where the inlet portion 11BA of the blowing flow path 11B is formed from a vicinity of the inclined surface 37Aa of the nose portion 37, in which backflow of air is likely to occur, to the third wall 33 side.

Accordingly, since it is possible to suppress occurrence of backflow of air in the inlet portion 11BA of the blowing flow path 11B formed between the third wall 33 and the flow path width adjusting unit 14, noise caused by the backflow of the air that has occurred in the inlet portion 11BA of the blowing flow path 11B can be reduced while suppressing an increase in the size of the vehicle air conditioning device 10.

Although a case where the flow path width adjusting unit 14 has the flow path width adjusting unit body 41 and the lid body 42 has been described as an example in the embodiment, the flow path width adjusting unit may be configured only by the flow path width adjusting unit body 41. In this case, effects which are the same as effects of the flow path width adjusting unit body 41 described in the present embodiment can be obtained.

Figure 6:
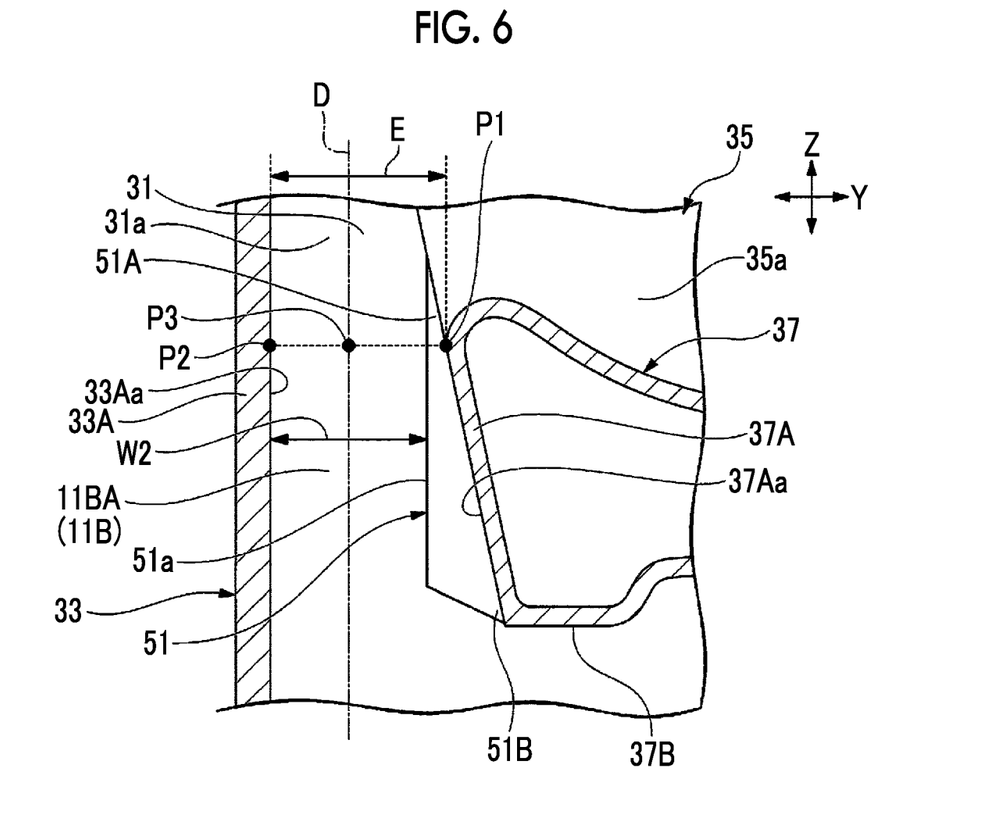
FIG. 6 is a view for describing a flow path width adjusting unit according to a modification example of the embodiment of the present invention.

Next, a flow path width adjusting unit 51 according to a modification example of the present embodiment will be described with reference to FIG. 6. In FIG. 6, the same components as the structure shown in FIG. 4 will be assigned with the same reference signs.

The flow path width adjusting unit 51 is a block material that has a flow path width adjusting surface 51a disposed on the third wall 33 side and facing the inner surface 33Aa of the side wall portion 33A. It is possible to dispose the flow path width adjusting surface 51a within a range that is the same as the range of the flow path width adjusting surface 41a described before.

The flow path width adjusting unit 51 has an upper end 51A connected to the fan mounting portion 35 and a portion positioned below the upper end 51A connected to the inclined surface 37Aa of the inclined portion 37A.

A lower end 51B of the flow path width adjusting unit 51 is disposed above the lower end 37B of the nose portion 37.

The flow path width adjusting unit 51 configured as described above can obtain effects which are the same as effects of the flow path width adjusting unit 14 described before.

Although the preferable embodiment of the present invention has been described in detail hereinbefore, the present invention is not limited to such an embodiment, and can be subjected to various modifications and changes within the gist of the present invention described in the scope of the claims.

REFERENCE SIGNS LIST

10: vehicle air conditioning device
11: housing
11A: fan accommodation space
11B: blowing flow path
11BA: inlet portion
11BB: increased diameter flow path portion
11C: evaporator accommodation space
11D: cold air flow path
11E: heater core accommodation space
11F: warm air flow path
11G: air mixing space
11H: defroster and face flow path
11I: center face discharge outlet
11J, 11K: side face discharge outlet
11L: defroster discharge outlet
13: blowing fan
14, 51: flow path width adjusting unit
14A, 41A, 51A: upper end
14B, 37B, 41B, 51B: lower end
15: evaporator
17: heater core
19: sliding damper
19A, 28A: rotary shaft
19B: sliding damper body
21, 22: front foot duct
24, 25: rear foot duct
28: foot rotary damper
28B: damper body
29: defroster face damper
31: first side wall
31a, 33Aa: inner surface
32: second side wall
33: third wall
33A: side wall portion
34: fourth wall
34a: outer surface
35: fan mounting portion
35a: surface
37: nose portion
37A: inclined portion
41: flow path width adjusting unit body
41a, 51a: flow path width adjusting surface
42: lid body
42A: one end part
42B: the other end part
D: imaginary plane
E: distance
F: space
M1: thickness
P1, P2: position
P3: intermediate position
W1, W2: width

The invention claimed is:

1. A vehicle air conditioning device comprising:
a blowing fan that blows air;
an evaporator that generates cold air by cooling the air blown from the blowing fan;
a heater core that generates warm air by warming the cold air;
a housing that has a fan accommodation space which accommodates the blowing fan, a blowing flow path which communicates with the fan accommodation space and guides the air blown from the blowing fan downward, an evaporator accommodation space which is disposed downstream of the blowing flow path, communicates with the blowing flow path, and accommodates the evaporator, a heater core accommodation space which is disposed downstream of the evaporator accommodation space and accommodates the heater core, a first side wall which is disposed on one side in a width direction, a second side wall which is disposed on the other side in the width direction, a third wall which is disposed in a front-rear direction orthogonal to the width direction and connects the first and second side walls to each other, a fan mounting portion which is provided on a surface of an inner surface of the first side wall, which is exposed to the fan accommodation space, and protrudes in a direction from the inner surface of the first side wall toward the second side wall, and on which the blowing fan is mounted, and a nose portion which is disposed on an outlet side of the fan accommodation space and defines an inlet portion of the blowing flow path with the third wall in the front-rear direction; and
a flow path width adjusting unit that is provided at the inlet portion of the blowing flow path by being connected to the inner surface of the first side wall, has an upper end connected to the fan mounting portion, extends downward, and is disposed between the third wall and the nose portion in the front-rear direction,
wherein the nose portion has an inclined portion that is inclined with respect to the third wall such that a width of the inlet portion of the blowing flow path increases in a direction from an inlet toward an outlet of the blowing flow path, and
the flow path width adjusting unit is formed such that a width of a portion of the inlet portion of the blowing flow path in the front-rear direction is decreased.

2. The vehicle air conditioning device according to claim 1,
wherein the flow path width adjusting unit includes a flow path width adjusting surface that faces an inner surface of the third wall, and
the flow path width adjusting surface is disposed between an imaginary plane that passes through an intermediate position between a position of the nose portion, at which a distance between the nose portion and the third wall in the front-rear direction is shortest, and a position of the third wall and the position of the nose portion.

3. The vehicle air conditioning device according to claim 1, wherein the flow path width adjusting surface is formed parallel to the inner surface of the third wall in a direction in which the inlet portion extends.

4. The vehicle air conditioning device according to claim 1,
wherein a width of the flow path width adjusting unit in the width direction is equal to or smaller than a thickness of the fan mounting portion in the width direction.

5. The vehicle air conditioning device according to claim 1,
wherein the blowing flow path includes an increased diameter flow path portion that is disposed downstream of the inlet portion of the blowing flow path, communicates with the inlet portion, extends in the front-rear direction to face the evaporator, and has a flow path cross-sectional area larger than the inlet portion, and
a lower end of the flow path width adjusting unit is disposed above a lower end of the nose portion.

6. The vehicle air conditioning device according to claim 1,
wherein the flow path width adjusting unit is a plate member that has a flow path width adjusting surface disposed on a third wall side.

7. The vehicle air conditioning device according to claim 1,
wherein the flow path width adjusting unit is a block material that has a flow path width adjusting surface disposed on a third wall side.

8. The vehicle air conditioning device according to claim 2,
wherein the flow path width adjusting unit is formed parallel to an inner surface of the side wall in a direction in which the inlet portion extends.

9. The vehicle air conditioning device according to claim 2,
wherein a width of the flow path width adjusting unit in the width direction is equal to or smaller than a thickness of the fan mounting portion in the width direction.

10. The vehicle air conditioning device according to claim 3,
wherein a width of the flow path width adjusting unit in the width direction is equal to or smaller than a thickness of the fan mounting portion in the width direction.

11. The vehicle air conditioning device according to claim 2,
wherein the blowing flow path includes an increased diameter flow path portion that is disposed downstream of the inlet portion of the blowing flow path, communicates with the inlet portion, extends in the front-rear direction to face the evaporator, and has a flow path cross-sectional area larger than the inlet portion, and
a lower end of the flow path width adjusting unit is disposed above a lower end of the nose portion.

12. The vehicle air conditioning device according to claim 3,
wherein the blowing flow path includes an increased diameter flow path portion that is disposed downstream of the inlet portion of the blowing flow path, communicates with the inlet portion, extends in the front-rear direction to face the evaporator, and has a flow path cross-sectional area larger than the inlet portion, and
a lower end of the flow path width adjusting unit is disposed above a lower end of the nose portion.

13. The vehicle air conditioning device according to claim 4,
wherein the blowing flow path includes an increased diameter flow path portion that is disposed downstream of the inlet portion of the blowing flow path, communicates with the inlet portion, extends in the front-rear direction to face the evaporator, and has a flow path cross-sectional area larger than the inlet portion, and
a lower end of the flow path width adjusting unit is disposed above a lower end of the nose portion.

14. The vehicle air conditioning device according to claim 2,
wherein the flow path width adjusting unit is a plate member that has a flow path width adjusting surface disposed on a third wall side.

15. The vehicle air conditioning device according to claim 3,
wherein the flow path width adjusting unit is a plate member that has a flow path width adjusting surface disposed on a third wall side.

16. The vehicle air conditioning device according to claim 4,
wherein the flow path width adjusting unit is a plate member that has a flow path width adjusting surface disposed on a third wall side.

17. The vehicle air conditioning device according to claim 5,
wherein the flow path width adjusting unit is a plate member that has a flow path width adjusting surface disposed on a third wall side.

18. The vehicle air conditioning device according to claim 2,
wherein the flow path width adjusting unit is a block material that has a flow path width adjusting surface disposed on a third wall side.

19. The vehicle air conditioning device according to claim 3,
wherein the flow path width adjusting unit is a block material that has a flow path width adjusting surface disposed on a third wall side.

20. The vehicle air conditioning device according to claim 4,
wherein the flow path width adjusting unit is a block material that has a flow path width adjusting surface disposed on a third wall side.

* * * * *